R. D. TURNER.

Improvement in Apparatus for the Manufacture of Vinegar.

No. 127,812.                        Patented June 11, 1872.

Witnesses:
Fred Haymer
Benj. F. Sharp.

Reuben D. Turner

UNITED STATES PATENT OFFICE.

REUBEN D. TURNER, OF NEW YORK, N. Y.

IMPROVEMENT IN APPARATUS FOR THE MANUFACTURE OF VINEGAR.

Specification forming part of Letters Patent No. 127,812, dated June 11, 1872; antedated May 27, 1872.

*To all whom it may concern:*

Be it known that I, REUBEN D. TURNER, of the city, county, and State of New York, have invented a new and useful Improvement in Apparatus for Manufacturing Vinegar; and I do hereby declare that the following is a full, clear, and exact description of the same, reference being had to the accompanying drawing forming a part of this specification, and in which—

Figure 1:
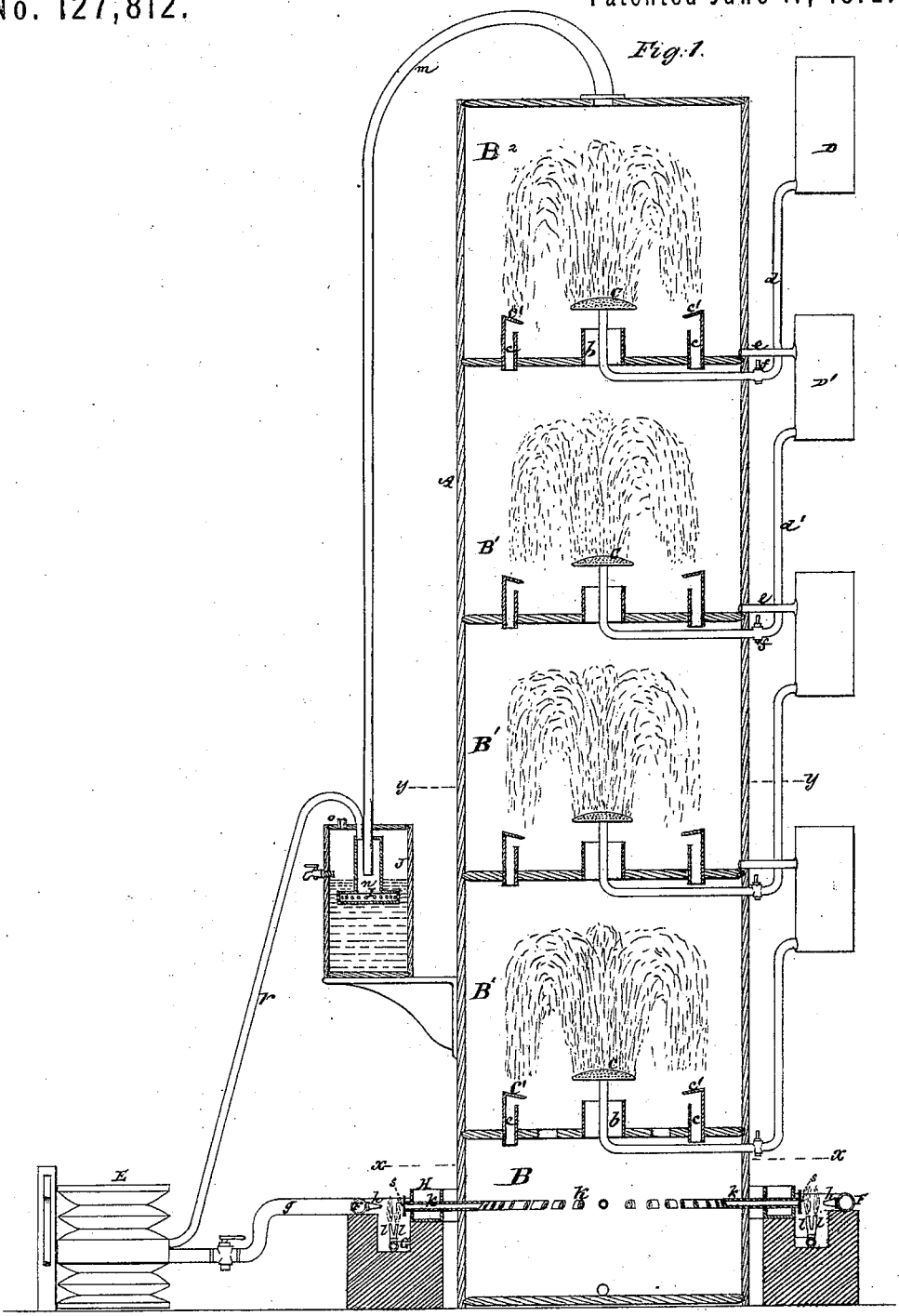
Figure 2:
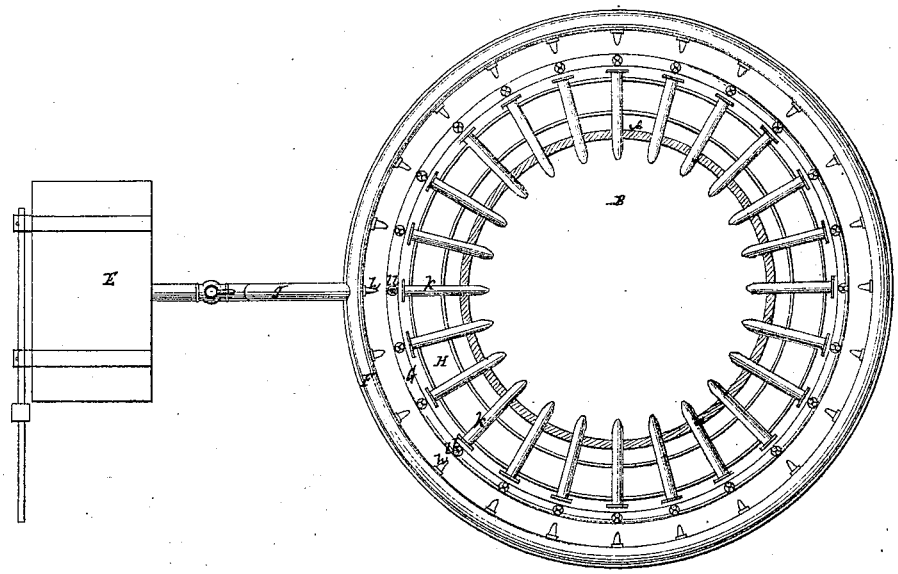

Figure 1 represents a sectional elevation of an apparatus constructed in accordance with my invention; Fig. 2, a horizontal section at the line $x\,x$ in Fig. 1; and Fig. 3, a horizontal section at the line $y\,y$ of the main body of the tank or acidulating-vessel of the apparatus.

Similar letters of reference indicate corresponding parts throughout the several figures of the drawing.

My invention, which, in its present application, relates to the manufacture of vinegar and acidulation of other liquids, consists, first, in an improvement in the means whereby ozone or ozonized air or gas is introduced into the acidulating vessel, the same consisting of an induction-pipe or pipes of enlarged diameter, to insure their being kept cool, but having their outer ends closed, with a perforation through them for the introduction of the ozone, whereby the latter is supplied in a purer state to the acidulating-vessel, and an objectionable influx of atmospheric air to the latter is avoided. The invention also consists in an arrangement of double burners, whereby the air or gas from which the ozone is to be obtained is projected through two small flames for the production of the ozone, thereby expediting or enlarging said production and preventing the overheating of the ozone. The invention likewise consists in a combination of a series of spray-chambers arranged one above the other and return vessels or ducts for passing the liquid to be treated from one chamber to another in succession in a downward direction, whereby the acidulation or treatment of the liquid is more expeditiously or perfectly effected. The invention furthermore consists in a novel device for preventing back action of the ozonized air or gas and for facilitating its ascent and distribution within the acidulating tank or vessel.

Prior to describing the apparatus it may be here stated that the general principle of the process by which the ozone is produced forms no part of this invention, the same consisting in passing a current of atmospheric air through a flame and causing the product to be passed by induction-tubes into the chamber or vessel in which it is required to collect the ozone.

Figure 3:
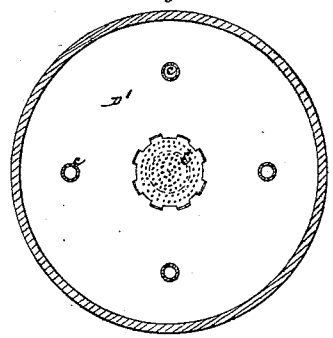

In the accompanying drawing, A represents the acidulating tank or vessel, divided into a series (not restricted as to number) of chambers, B, $B^1$, $B^2$, all in communication with one another by upwardly-projecting necks $b\,b$ and tubes $c\,c$ at points around the necks. These necks and tubes are purely ducts for the ozonized air in its upward passage from one chamber to another, and are protected against flow of the liquid down through them—that is, the tubes $c\,c$—by hoods $c'$, and the necks $b\,b$ by detached overhead and overhanging rose-head distributers C C of the liquid to be acidulated. Said liquid is first introduced into an upper vessel, D, and from thence conducted, by a pipe, $d$, to the top distributer C, which scatters the liquid in a spray within the upper chamber $B^2$, from whence it passes, by a return-pipe, $e$, to a second lower vessel, D', to be conveyed by a pipe, $d'$, to the next distributer C beneath, and so on, from chamber to chamber, till it reaches the lower chamber B, from whence the liquid is drawn or run off, the same having been acidulated in its descent by the upward progress and dissemination of the ozonized air among the liquid in the spray-chambers. The pipes $d$ $d'$, which convey the liquid to the roses C C, should be provided with cocks $f\,f$ to regulate the supply, and said roses, channeled or grooved at their edges with the intervening portions, turned up, as shown in Fig. 3, to open or separate the returning liquid as it flows over them and to effect a more thorough exposure of the same to the ozonized air. E is the blower by which the air to be ozonized is forced through a pipe, $g$, into an annular distributer, F, from whence it is projected by nozzles $h$ against and through a flame or flames and the product conducted by induction-pipes $k$ into the lower chamber B of the acidulating-tank. It is preferred to employ duplicate burners $l\,l$ for the production of the detached flames, said burner or each pair of burners, one behind the other, projecting from an annular gas-pipe, G. By this use of duplicate burners for each nozzle $h$ and induction-pipe $k$ the air ejected by the blower through the nozzles is caused to pass through a large extent of flame without risk of overheating and free from any large consumption of gas, while the ozone is separated or formed, partly by the heat and partly by the friction of the flame on the air passing through it, to a fuller extent or more perfectly than is attained by a single burner and flame. The induction-pipes $k$ project through an annular cooling water-trough, H, and are of an enlarged diameter, so as to prevent a considerable cooling-surface; but as such pipes, if open at their outer ends to the full extent of their area, would cause atmospheric air to enter and dilute the ozone, thereby impairing its efficiency in the acidulating-tank and also introducing a too free or copious supply of common air therein, I close the outer ends of said induction-pipes $k$, with the exception of a small perforation, $s$, of no larger diameter or area than the ozone current, or preferably less, so that only pure ozonized air will enter the tank and the supply be so moderate or gradual that no violent upward current will be produced in the tank. To prevent any back action of such current by the descending liquid I cement the upper spray-chamber $B^2$ by a pipe, $m$, with a tubular stem, $n$, of a stationary perforated hollow disk, I, arranged so as to be submerged in a water-cylinder or chamber, J, that is provided with an air-escape, $o$. Connected with the blower E is a pipe, $r$, that projects downward into the hollow stem $n$, causing air to be forced out through the latter and perforated disk I, and producing a suction or draught on the lower end of the pipe $m$, which effects the desired result in a most perfect manner.

What is here claimed, and desired to be secured by Letters Patent, is—

1. The ozone induction-pipe or pipes $k$, formed with a contracted aperture, $s$, at their outer closed ends, in combination with the nozzle or nozzles $h$ and intermediate burner or burners, substantially as specified.

2. The duplicate intermediate burners $l\ l$, arranged one in rear of the other, in combination with the nozzles $h$ and ozone induction-pipes $k$, essentially as herein set forth.

3. The combination of a series of spray-chambers, $B^1\ B^1\ B^2$, arranged one above the other, and in communication with each other by ozone inlets $b$ and $c$, or either, the vessels $d\ d'$ with their distributing-pipes $d\ d$, distributers C, and return-pipes $e$, and the ozone-distributing devices in the lower chamber B, substantially as specified.

4. The combination, with the tank A, of the upper connecting-pipe $m$, the hollow stem $n$, the perforated hollow disk I, the water-chamber J, and the blow-pipe $r$, essentially as and for the purpose herein set forth.

REUBEN D. TURNER.

Witnesses:
FRED. HAYNES,
R. E. RABEAU.